Sept. 24, 1963          E. LONG          3,105,028
APPARATUS FOR REMOVING CONTAMINATED COOLANT FROM REACTOR SYSTEM
Filed Jan. 21, 1959
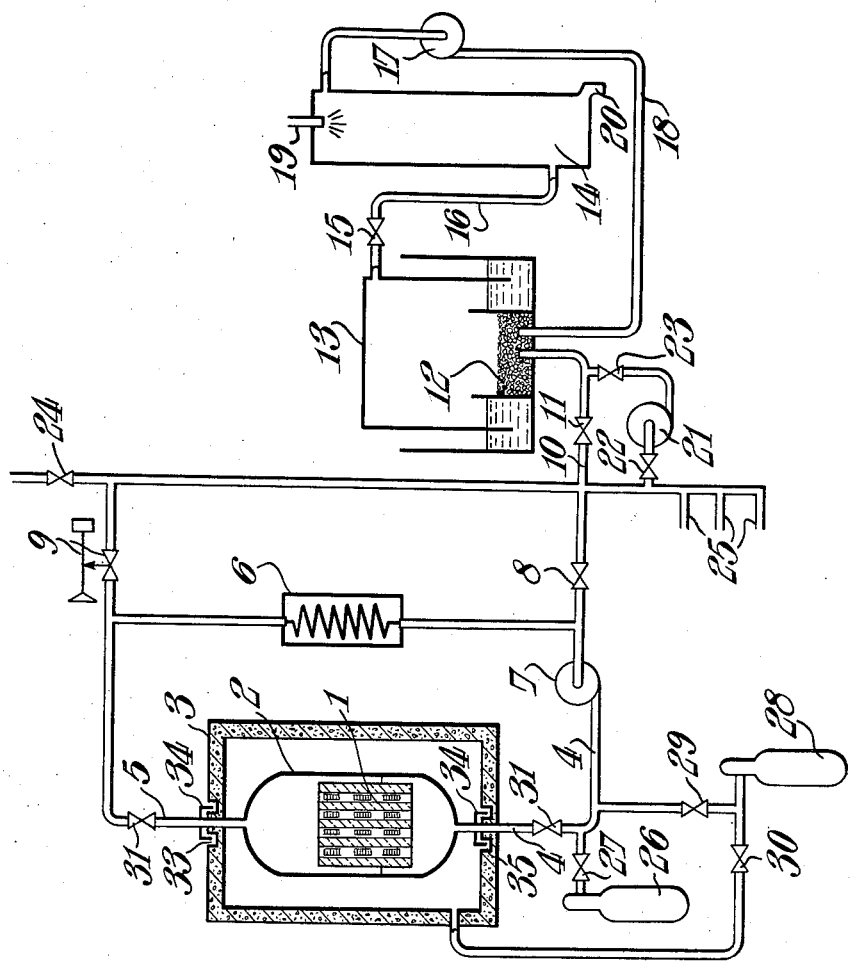
INVENTOR
EVERETT LONG
BY *Larson and Taylor*

3,105,028
APPARATUS FOR REMOVING CONTAMINATED COOLANT FROM REACTOR SYSTEM
Everett Long, Culcheth, near Warrington, England, assignor to the United Kingdom Atomic Energy Authority, London, England
Filed Jan. 21, 1959, Ser. No. 788,129
Claims priority, application Great Britain Feb. 12, 1958
3 Claims. (Cl. 204—193.2)

This invention relates to nuclear reactors of the kind using sheathed fuel elements so that the coolant does not become contaminated in the course of normal reactor operation.

In present day nuclear reactors cooled by carbon-dioxide circulating in a closed circuit (in which heat transferred to the coolant in the reactor is exchanged at one or more heat exchangers and in which coolant, which may be under pressure, is circulated by blower means), a blow-off safety valve and a blow-down valve are provided in the circuit, both valves venting to atmosphere. Should an incident occur in the reactor such that the gas and the circuit become heavily contaminated with radioactive materials it will no longer be permissible to allow the coolant gas from the circuit to discharge to the atmosphere.

It is accordingly an object of the invention to provide, in conjunction with a nuclear reactor of the kind described, means for accommodating coolant from the reactor when contaminated with radioactive material to a level preventing its discharge to the atmosphere.

The invention comprises a gas cooled reactor with closed circuit cooling and a valve for relieving pressure in the coolant circuit, wherein a duct is provided from the valve to an absorber capable of absorbing the coolant gas with or without a gas holder connected in closed circuit with said absorber.

By way of example the invention will now be described with reference to the accompanying drawing which is a diagrammatic elevation.

In the drawing is shown a reactor core 1 of the kind using sheathed fuel elements housed in a pressure vessel 2 surrounded by a biological shield 3. A closed carbon-dioxide coolant circuit for the reactor is provided comprising the core 1 and the pressure vessel 2, coolant inlet and outlet ducts 4, 5 for the pressure vessel, a heat exchanger 6 and a pump 7. The coolant circuit is provided with a blow-off safety valve 9 and a blow-down valve 8 which are vented through a pipe 10 and valve 11 into a stone-filled pit 12 associated with a single lift gas-holder 13. A carbon dioxide absorption tower 14 is coupled in closed circuit with the gas-holder 13 via a valve 15, pipe 16, pump 17 and return pipe 18. The absorption tower is conveniently of the drain column type packed with Raschig rings and provided with continuously recirculated NaOH solution absorber fed to the tower at sprinkler 19 and removed for recirculation at the pipe 20. A pump 21 and two valves 22, 23 are provided between the reactor coolant circuit and the gas holder 13 so that the reactor can be maintained at sub-atmospheric pressure if so required. A valve 24 is provided venting to atmosphere for normal reactor depressurisation and ducts 25 are provided coupling with other near-by reactors. Fire extinguisher materials are contained in a reservoir 26 connected with the coolant circuit via a valve 27 and a source of pure carbon dioxide is contained in a reservoir 28 connected with the inlet duct 4 via a valve 29 and with the void between the pressure vessel 2 and the shield 3 via a valve 30. Isolation valves 31 are fitted in the ducts 4 and 5, and means are provided for sealing off the reactor core and pressure vessel 2 inside the biological shield 3. It is arranged that all components passing through the shield fall into one or other of two categories, namely, those that move differentially with respect to the shield with temperature changes and those that do not so move. The components in the first category are arranged to pass through the shield vertically and are provided with aprons 34 dipping into cavities 33, 35 which can be filled with liquid to effect a movable seal and the components in the second category are plugged into the shield to seal them.

The operation of apparatus according to the invention will now be considered in relation to a number of different circumstances.

(1) *Normal reactor operation.*—The valves 8 and 24 are closed, the pump 7 is running, the valve 9 is on its seat, valve 11 is open, valves 22 and 23 are closed, the pump 21 is stopped, the valve 15 is closed and the absorption tower is not working.

(2) *Normal depressurisation.*—The reactor is closed down, the pump 7 is reduced in speed and the valves 8 and 24 are opened and the valve 11 is closed.

(3) *Failure of pump 7 when reactor operating normally.*—The failure of the pump 7 will cause the reactor to shut down. In the absence of forced circulation of coolant there will be a period when more heat goes into the coolant than is removed from it so that its mean temperature will increase and its pressure increase so that the valve 9 opens to discharge some coolant along the pipe 10 and valve 11 to the gas-holder 13. When conditions settle down the gas in the gas-holder 13 is monitored to check its radioactivity and, subject to a satisfactory level of radioactivity it is allowed to discharge to atmosphere through the valve 24.

(4) *Incident 3 followed by damage to or combustion of some of the fuel elements.*—This could be due to excessive temperature rise followed by exothermic reaction between the carbon-dioxide coolant and the fuel elements.

The coolant, contaminated with fission products, will find its way to the gas-holder via the blow-off valve 9. The reactor control operator will be aware of damaged fuel elements by readings from his burst fuel element detection apparatus (coolant flow being maintained by natural convection). The valve 8 will be opened to accelerate depressurisation. The gas-holder 13 is capable of receiving all the coolant in the reactor. In passage through the stone pit 12 heat is removed from the coolant so that its volume is reduced and so that it does not introduce thermal stresses in the gas-holder. At some convenient time the gas in the gas holder 13 is led to the absorber 19. The sodium hydroxide of the absorber 19 absorbs the carbon dioxide coolant gas and any other soluble gases present as well as retaining solid matter such as fragments of fission products. Any gas not absorbed, for example xenon, the volume of which will be very small compared with the volume of coolant gas present in the gas-holder 13 is returned to the gas-holder. To purge the reactor clean after faulty fuel elements have been removed the reservoir 28 is connected into the coolant circuit by opening the valve 29. When the activity of residual gas in the gas-holder allows, it can be discharged to atmosphere. The absorbed coolant in the form of a sodium carbonate sludge with solid fission products present, is removed from the absorber 19 and the absorber made ready with a fresh charge of sodium hydroxide.

By absorbing the coolant gas, the majority of fission products present can be reduced to a concentrated form leaving insoluble gases (of very small volume) to be discharged to the atmosphere when their activity is reduced to a tolerable level.

(5) *Damage or combustion of fuel without valve 9 opening.*—This position is similar to that described in 4 above except that discharge of coolant comes under operator control instead of initial control by the valve 9. Generally a quick blow-down will be desired on the grounds that as the coolant is removed the possibility or extent of combustion is reduced.

(6) *Breach of the coolant circuit with biological shield 3 intact.*—Any breach occuring outside the confines of the shield 3 can be isolated by the valves 31 and escape of radioactive material can be avoided. Any breach inside the shield 3 will cause the void between the shield and reactor to become filled with carbon-dioxide coolant. Some of the coolant will escape via apertures in the shield but this should not be hazardous as a breach in the coolant circuit should not be hazardous as a breach in the coolant circuit should not be consequent upon a nuclear accident but rather as consequent upon mechanical failure of the circuit. When the pressure in the void reaches atmospheric pressure the cavities 33, 35 are filled with water, and the valve 30 is opened so that clean carbon-dioxide feeds into the void. The valve 11 is closed, the valves 22 and 23 opened and the pump 21 started so that the carbon-dioxide in the void flows outwards through minor leakage paths in the shield 3 to keep air out and inwards through the breach in the coolant circuit. Should a nuclear incident now follow upon the disturbance caused by the breach it will be contained, the feed of clean carbon-dioxide from the reservoir 26 can be maintained for a long time so long as the absorber 14 is kept in service and so long as air (which would not be absorbed) is kept out of the coolant circuit.

I claim:

1. In combination with a nuclear reactor having a closed coolant system through which coolant in the form of carbon dioxide gas is circulated, apparatus for removing contaminated gas coolant from the system and defining an absorption tower and liquid sodium hydroxide disposed in said tower to concentrate the contaminated gas for disposal, said apparatus including means for circulating said liquid sodium hydroxide through the absorption tower.

2. In combination with a nuclear reactor having a closed coolant system through which coolant in the form of carbon dioxide gas is circulated, apparatus for removing contaminated gas coolant from the system and defining a gas storage chamber, an absorption tower, duct means connecting the storage chamber to the coolant system, duct means connecting the absorption tower to the storage chamber, liquid sodium hydroxide in the absorption tower and pump means for circulating said sodium hydroxide through said tower.

3. The combination of claim 2 wherein a gas cooler is provided to reduce the volume of coolant gas passing from said system to said storage chamber.

References Cited in the file of this patent

UNITED STATES PATENTS

| | | |
|---|---|---|
| 2,782,158 | Wheeler | Feb. 19, 1957 |
| 2,809,931 | Daniels | Oct. 15, 1957 |
| 2,851,409 | Moore | Sept. 9, 1958 |
| 2,868,708 | Vernon | Jan. 13, 1959 |

FOREIGN PATENTS

| | | |
|---|---|---|
| 794,329 | Great Britain | Apr. 30, 1958 |